United States Patent
Kim et al.

(10) Patent No.: US 11,645,615 B2
(45) Date of Patent: May 9, 2023

(54) COMPUTER-IMPLEMENTED METHODS AND SYSTEMS FOR EFFICIENT SORTATION OF ITEMS BASED ON LIMITED ACCESS TO ITEM INFORMATION

(71) Applicant: COUPANG CORP., Seoul (KR)

(72) Inventors: Woong Kim, Seoul (KR); Lianxi Bai, Seoul (KR); Ji Won Hwang, Seoul (KR); Sung Eun Kim, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 95 days.

(21) Appl. No.: 17/107,998

(22) Filed: Dec. 1, 2020

(65) Prior Publication Data
US 2021/0150463 A1 May 20, 2021

Related U.S. Application Data

(63) Continuation of application No. 16/687,756, filed on Nov. 19, 2019, now Pat. No. 10,878,377.

(51) Int. Cl.
*G06Q 10/08* (2023.01)
*G06Q 10/087* (2023.01)
(Continued)

(52) U.S. Cl.
CPC ....... *G06Q 10/087* (2013.01); *G06F 16/2379* (2019.01); *G06F 16/252* (2019.01)

(58) Field of Classification Search
CPC .................................................. G06Q 10/087
See application file for complete search history.

(56) References Cited

U.S. PATENT DOCUMENTS

| 7,984,809 | B1   | 7/2011 | Ramey et al. |
| 8,718,814 | B1 * | 5/2014 | Clark ............... G06Q 10/08 700/214 |

(Continued)

FOREIGN PATENT DOCUMENTS

| CN | 103489140   | 1/2014  |
| CN | 107428461 A | 12/2017 |

(Continued)

OTHER PUBLICATIONS

Notice of Preliminary Rejection in counterpart Korean Patent Application No. 10-2022-0012044 dated Feb. 17, 2022 (8 pages).
Notice of Preliminary Rejection dated Feb. 4, 2021 in Korean Application No. 10-2020-0003683, 26 pages.
Office Action dated Aug. 31, 2021, by the Taiwanese Patent Office in counterpart Taiwanese Application No. 109134384, 9 pages.

(Continued)

*Primary Examiner* — A. Hunter Wilder
(74) *Attorney, Agent, or Firm* — Finnegan, Henderson, Farabow, Garrett & Dunner LLP

(57) ABSTRACT

Computer-implemented systems and methods for providing instructions to a user are disclosed. The systems and methods may be configured to: receive a first user input of a container identifier, the container identifier corresponding to a physical container comprising one or more items associated with one or more orders; retrieve, from a networked database, one or more item identifiers associated with the container identifier, the item identifiers corresponding to the items; receive a second user input of a first item identifier, the first item identifier corresponding to a first item among the items; assign, among one or more locations, a first location to the first item identifier; and display the instructions to the user for placing the first item at the first location.

16 Claims, 22 Drawing Sheets

(51) Int. Cl.
  *G06F 16/25* (2019.01)
  *G06F 16/23* (2019.01)

(56) References Cited

U.S. PATENT DOCUMENTS

| | | | |
|---|---|---|---|
| 8,839,132 | B2 | 9/2014 | Reichert |
| 10,325,240 | B2 | 6/2019 | Briggman et al. |
| 10,350,755 | B2 | 7/2019 | Wagner et al. |
| 2004/0153379 | A1 | 8/2004 | Joyce et al. |
| 2009/0081008 | A1* | 3/2009 | Somin .................. G06Q 10/087 705/28 |
| 2014/0188671 | A1 | 7/2014 | Mountz et al. |
| 2014/0279272 | A1* | 9/2014 | Inman ................ G06Q 30/0635 705/26.81 |
| 2014/0350717 | A1 | 11/2014 | Dagle et al. |
| 2015/0058245 | A1 | 2/2015 | Matthews |
| 2016/0232490 | A1 | 8/2016 | Mountz et al. |
| 2016/0239799 | A1 | 8/2016 | Burch, V et al. |

FOREIGN PATENT DOCUMENTS

| | | |
|---|---|---|
| JP | 2014-139103 | 7/2014 |
| JP | 2019-21065 | 2/2019 |
| JP | 2019-108228 | 7/2019 |
| KR | 10-2002-0061293 | 7/2002 |
| KR | 10-2017-0016091 | 2/2017 |
| KR | 10-1953069 | 2/2019 |
| KR | 10-1953069 B1 | 2/2019 |
| WO | WO 2009/002798 A1 | 12/2008 |
| WO | WO2012/165070 | 12/2012 |
| WO | WO2016/157367 | 8/2017 |

OTHER PUBLICATIONS

Examination Notice dated Oct. 4, 2021, by the Hong Kong Patent Office in counterpart Hong Kong Application No. 22020017101.9, 6 pages.
Examination Report No. 2 dated Jun. 24, 2021, by the Australian Patent Office in counterpart Australian Application No. 2020264287, 4 pages.
Notice of Preliminary Rejection dated Jul. 20, 2021, by the Korean Patent Office in counterpart Korean Application No. 10-2020-0003683, 6 pages.
Examination Report dated Dec. 1, 2020, by the Australian Patent Office in Australian Application No. 2020264287, 8 pages.
International Search Report and Written Opinion dated Jan. 4, 2021 in PCT International Application PCT/IB2020/058792, 10 pages.
"Hanel Lean-Lift Batch Picking Case Study," Youtube, Retrieved from Internet at https://www.youtube.com/watch?v=YaF5H_pLXJc, p. 1, dated Oct. 10, 2010.
Hong Kong Examination Notice in counterpart Hong Kong Patent Application No. 22020017101.9, dated Aug. 8, 2022, 2 pages.
Taiwanese Office Action and Search Report in counterpart Taiwanese Patent Application No. 111106625 dated May 27, 2022, (15 pages).
Japanese Office Action in counterpart Japanese Patent Application No. 2020-567842 dated Jun. 22, 2022 (22 pages).
Notice of Preliminary Rejection in counterpart Korean Patent Application No. 10-2020-0003683 dated Sep. 6, 2022 (5 pages, translation included).
Notice of Allowance dated Jan. 27, 2023, by the Korean Patent Office in counterpart Korean Application No. 10-2022-0012044, 5 pages.

* cited by examiner

TASK LIST 810

| CELL | BATCH ID | ITEM NAME | ITEM ID | CONTAINER ID | PROCESSED | FINALIZED |
|---|---|---|---|---|---|---|
| A01 | 23789789 | Grated Parmesan Cheese | 8801587928272 | 13-RCRT0-27-848 | 4/4 | YES |
| A02 | 23789789 | Grated Parmesan Cheese | 8801587928272 | 13-RCRT0-27-848 | 2/2 | YES |
| A03 | 23789789 | Moisturizing Lotion | 3183813853510 | 16-RCRT0-35-508 | 3/5 | NO |
| B01 | 23789789 | Grated Parmesan Cheese | 8801587928272 | 13-RCRT0-27-848 | 1/2 | YES |
| B01 | 23789789 | Cherry Granola Cereal | 5163813333555 | 16-RCRT0-35-508 | 3/3 | YES |

FIG. 8A

COMPUTER-IMPLEMENTED METHODS AND SYSTEMS FOR EFFICIENT SORTATION OF ITEMS BASED ON LIMITED ACCESS TO ITEM INFORMATION

RELATED APPLICATIONS

This application is a continuation of U.S. patent application Ser. No. 16/687,756 (now allowed) filed on Nov. 19, 2019, which is hereby incorporated by reference in the present application.

TECHNICAL FIELD

The present disclosure generally relates to computerized methods and systems for providing instructions for fast order fulfillment to a user who may be working with a limited scope. In particular, embodiments of the present disclosure relate to inventive and unconventional systems that display a user interface (UI), which expedites order fulfillment by allowing workers to focus on tasks immediately in front of them while the systems optimize the order fulfillment process as a whole and provide only the resources necessary for the workers to complete the tasks.

BACKGROUND

With proliferation of the Internet, online shopping has become one of the major avenues of commerce. Consumers and businesses are purchasing goods from online vendors more frequently than ever, and the number of transactions and sales revenue are projected to grow year-over-year at a staggering rate. As the scope and volume of e-commerce continue to grow, both a number of different products available online and an average number of purchases made in a given period are growing exponentially. It has thus become very important to optimize processes of fulfilling an order, which starts when a customer places an order and ends when the order is delivered to the customer.

Of the different processes that are involved such as retrieving items included in the order, packaging the items, and shipping, various solutions for retrieving the items already exist to make the process more efficient. One common solution is to reorganize items in a group of orders based on their location within a fulfillment center, retrieving the items based on the reorganized groups, and sorting them back to individual orders for packaging. This solution allows efficient retrieval of items from inventory, decreasing distances the workers must travel in order to retrieve the items and making the workers work faster as they gain familiarity with a limited area that they are assigned to.

However, this solution introduces new problems when the items must be sorted back to individual orders for packaging. Different items of a single order may have been divided into multiple groups along with items from other orders, where each group may be at different stages of retrieval. Some groups may still be waiting for assignment to a worker for retrieval, some may be in the middle of retrieval, and some may be finished and are ready for sorting. With existing solutions, this mix up is a source of delay, where sorting workers must track where different items of an order are located, prioritize those that are ready for sorting, and the like. Data associated with these information (i.e., status of each item of an order for thousands or millions of orders) may be collected and stored by existing solutions, but the sorting workers often have limited access to such data, and it is impractical to equip every sorting worker with resources to look up necessary information. Even assuming that every sorting worker were provided with the information, it would take too much time for sorting workers to process the enormous amount of data, resulting in decreased productivity.

Therefore, there is a need for improved systems and methods for facilitating the sorting process by processing a mountain of data gathered throughout the order fulfillment process and presenting necessary information in a controlled manner, so that workers may be able to focus solely on sorting even with a limited understanding of the overall process.

SUMMARY

One aspect of the present disclosure is directed to a computer-implemented system for providing instructions to a user. The system may comprise a memory storing operations; and at least one processor configured to execute the operations. The operations may comprise: receiving a first user input of a container identifier, the container identifier corresponding to a physical container comprising one or more items associated with one or more orders; updating, in a networked database, a first container location identifier associated with the container identifier to include a physical location of the computer-implemented system; retrieving, from the networked database, one or more item identifiers associated with the container identifier, the item identifiers corresponding to the items; updating, in the networked database, one or more item location identifiers associated with the item identifiers to include the physical location of the computer-implemented system; receiving a second user input of a first item identifier, the first item identifier corresponding to a first item among the items; based on receiving the second user input, assigning, among one or more locations, a first location to the first item identifier; displaying the instructions to the user for placing the first item at the first location; and updating, in the networked database, a first item location identifier associated with the first item identifier to include the first location.

Yet another aspect of the present disclosure is directed to a computer-implemented method for providing instructions to a user. The method may comprise: receiving a first user input of a container identifier, the container identifier corresponding to a physical container comprising one or more items associated with one or more orders; updating, in a networked database, a first container location identifier associated with the container identifier to include a physical location of the computer-implemented system; retrieving, from the networked database, one or more item identifiers associated with the container identifier, the item identifiers corresponding to the items; updating, in the networked database, one or more item location identifiers associated with the item identifiers to include the physical location of the computer-implemented system; receiving a second user input of a first item identifier, the first item identifier corresponding to a first item among the items; based on receiving the second user input, assigning, among one or more locations, a first location to the first item identifier; displaying the instructions to the user for placing the first item at the first location; and updating, in the networked database, a first item location identifier associated with the first item identifier to include the first location.

Still further, another aspect of the present disclosure is directed to a computer-implemented system for an efficient sortation of items by a user working under a limited access to information. The system may comprise a memory storing operations; and at least one processor configured to execute the operations. The operations may comprise: receiving a first user input of a container identifier, the container identifier corresponding to a first physical container comprising one or more items associated with one or more orders; updating, in a networked database, a first container location identifier associated with the container identifier to include a physical location of the computer-implemented system; retrieving, from the networked database, one or more item identifiers associated with the container identifier, the item identifiers corresponding to the items; updating, in the networked database, one or more item location identifiers associated with the item identifiers to include the physical location of the computer-implemented system; receiving a second user input of a first item identifier, the first item identifier corresponding to a first item among the items; identifying, among the orders, a first order associated with the first item, wherein the first order comprises a second item associated with a second physical container; based on receiving the second user input, assigning, among one or more locations, a first location to the first item identifier; displaying the instructions to the user for placing the first item at the first location; updating, in the networked database, a first item location identifier associated with the first item identifier to include the first location; receiving, from the networked database, an indication that the second physical container is delayed based on a second container location identifier associated with the second physical container; and displaying the instructions to the user for finalizing the first location without the second item.

Other systems, methods, and computer-readable media are also discussed herein.

BRIEF DESCRIPTION OF THE DRAWINGS

FIG. 7E is an exemplary embodiment of the sorting UI where the user is instructed to finalize a particular group of locations, consistent with the disclosed embodiments.

FIG. 7G is an exemplary embodiment of the sorting UI where the user is shown a notification that a particular location will be closed soon, consistent with the disclosed embodiments.

FIG. 8A is an exemplary embodiment of the sorting UI displaying a consolidated list of tasks assigned to the user, consistent with the disclosed embodiments.

DETAILED DESCRIPTION

Figure 1A:
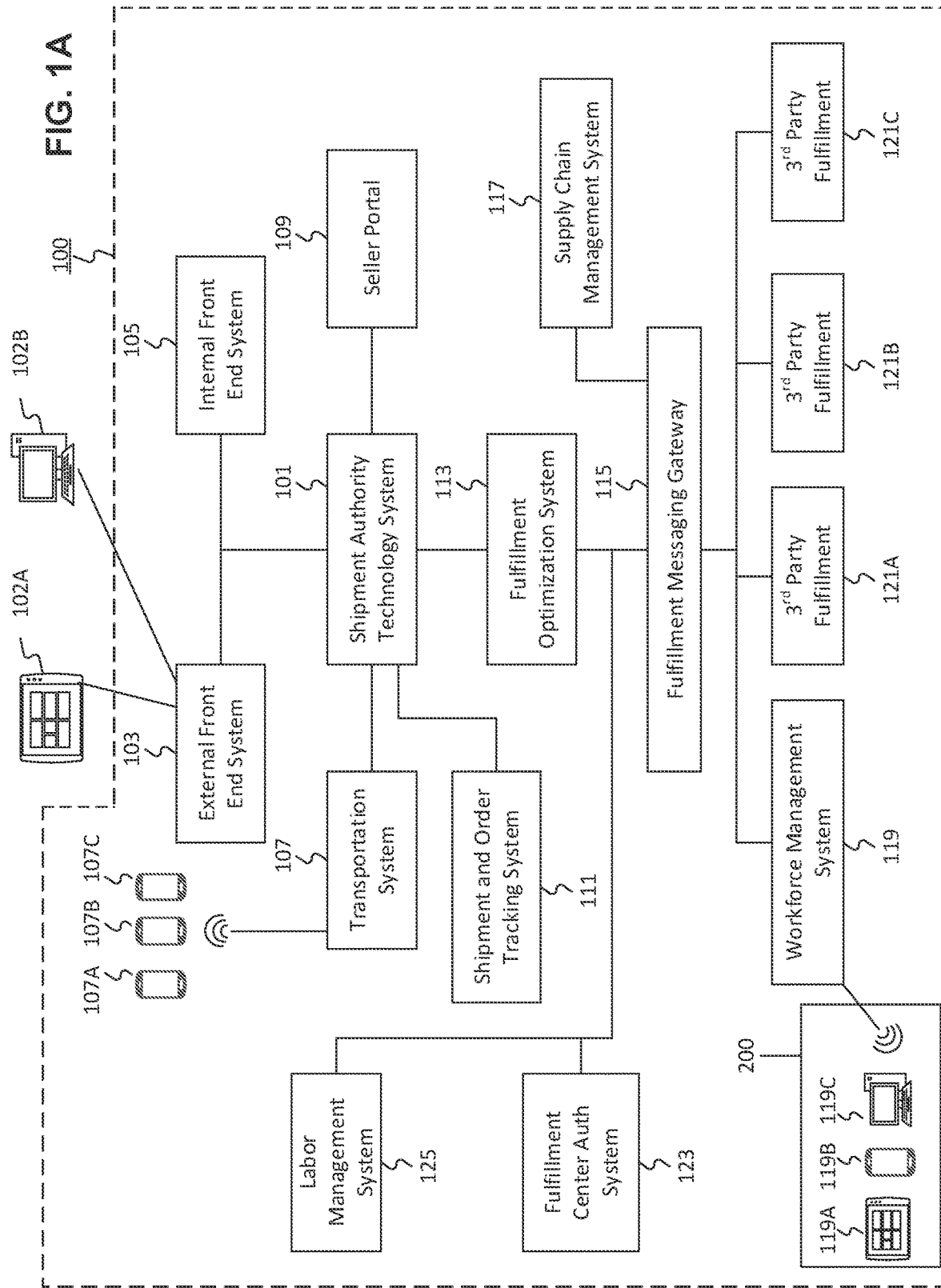
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to a UI that expedites order fulfillment by allowing workers to focus on tasks immediately in front of them while other systems optimize the order fulfillment process as a whole and provide only the resources necessary for the workers to complete the tasks. Specifically, the UI may facilitate a sorting process by processing the mountain of data gathered throughout the order fulfillment process and presenting necessary information in a controlled manner.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
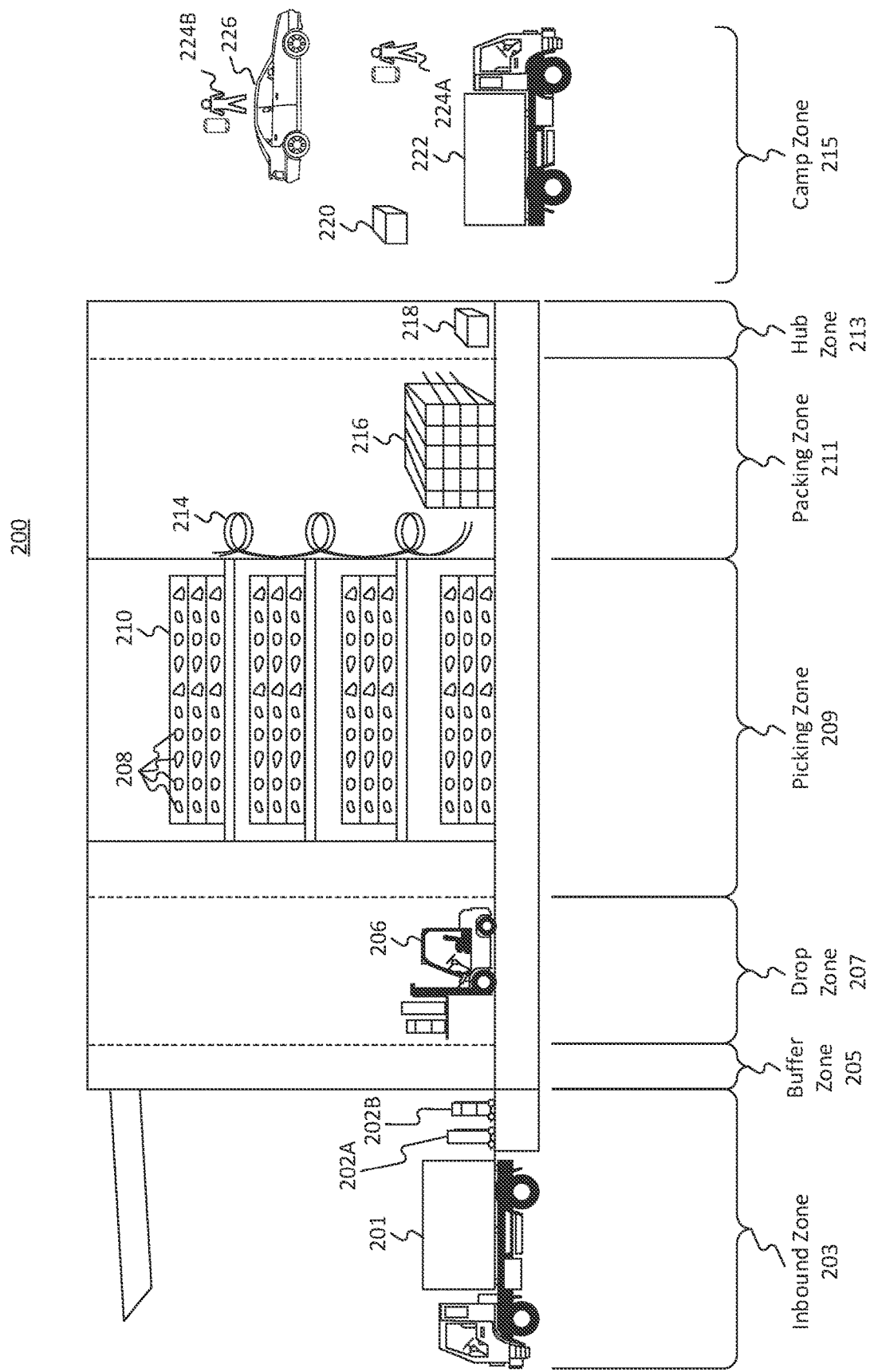
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
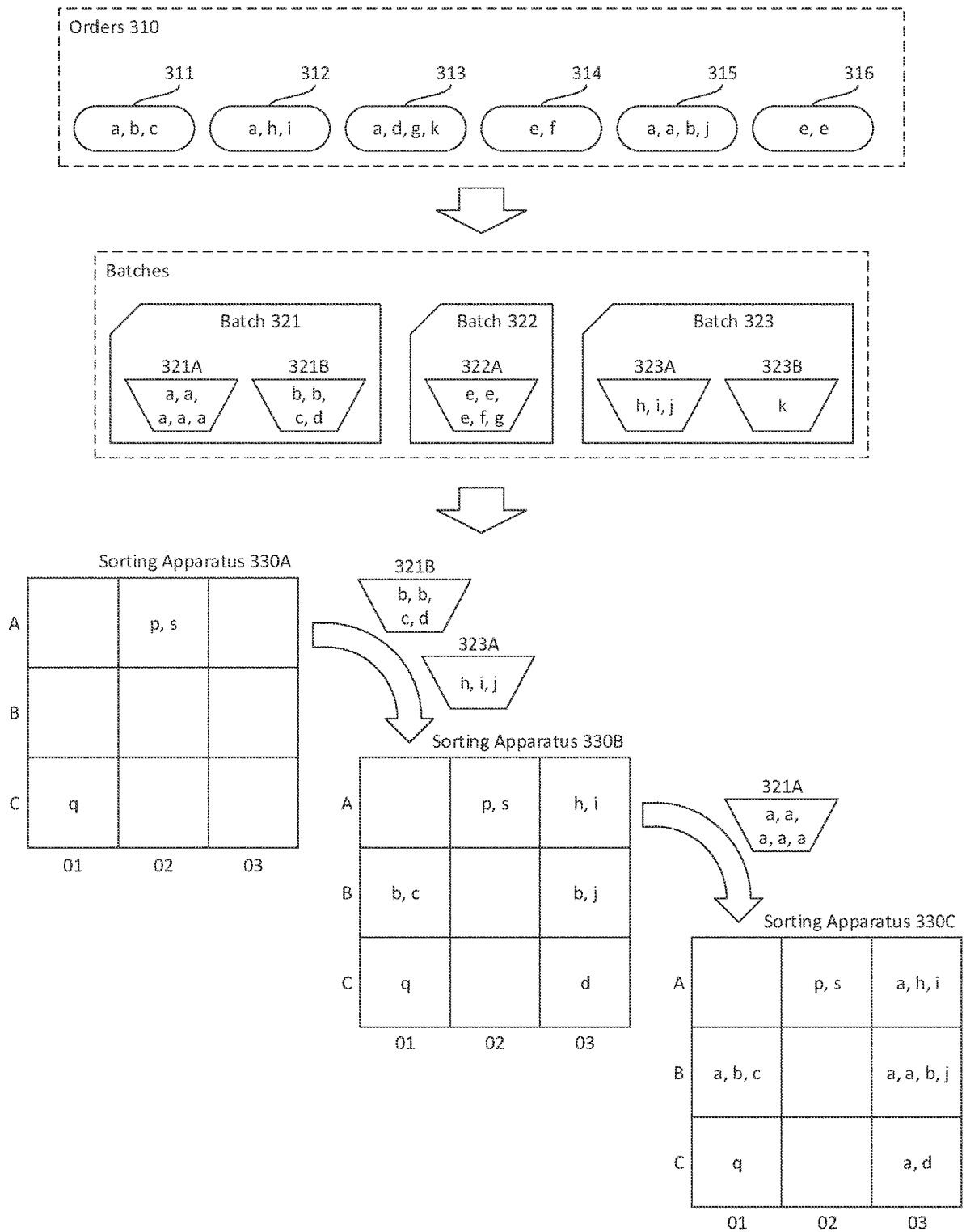
FIG. 3 is a diagrammatic illustration of an exemplary order fulfillment process, consistent with the disclosed embodiments.

FIG. 3 is a diagrammatic illustration of an exemplary order fulfillment process 300. Order fulfillment process 300 may begin when customers places orders via external front-end system 103. In some embodiments, FO system 113 may aggregate the orders for a predetermined period of time until an order set 310 is created, comprising of orders 311-316. Each of the orders 311-316 may include any combination of items (e.g., items a-k). For example in FIG. 3, order 311 includes items a, b, and c; order 312 includes items a, h, and i; order 313 includes items a, d, g, and k; order 314 includes items e and f; order 315 includes items a, a, b, and j (i.e., two of item a and one each of items b and j); and order 316 includes two of item e.

In order to expedite the picking process described above, FO system 113, in some embodiments, may reorganize the purchased items in orders 311-316 into one or more batches 321-323 based on, for example, each item's location within FC 200. For example in FIG. 3, batch 321 includes five of item a, two of item b, and one each of items c and d; batch 322 includes three of item 3 and one each of items f and g; and batch 323 includes one each of items h, i, j, and k. In some embodiments, FO system 113 may assign each batch to different workers (e.g., pickers), who may then pick each item in their respective batch from picking zone 209. Although pickers are described as human, it should be noted that pickers may be implemented as automated machines and not limited to the examples described herein. For ease of explanation without causing ambiguity, pickers are described as individuals hereinafter unless specifically stated otherwise.

In further embodiments, items in each batch may be divided into one or more subgroups based on a capacity of containers 321A, 321B, 322A, 323A, and 323B. For example in FIG. 3, items assigned to batch 321 are split between containers 321A and 321B, which contain five of item a; and two of item b and one each of items c and d, respectively. Similarly, items assigned to batch 323 are split between containers 323A and 323B, which contain each of items h, i, and j; and one of item k, respectively. On the other hand, all of the items assigned to batch 322 are contained in container 322A, which indicates that combined weight and volume of the items are within a weight capacity and a volume capacity of container 322A. Although items in each batch are divided into one or two containers, the number is only exemplary and a batch may contain more than two containers.

Once all of the items in a container are picked, the picker may transfer the container to packing zone 211 via transport mechanism 214 as described above with respect to FIG. 2. It should be noted, however, that because items in each container may be picked by different pickers, each container may arrive packing zone 211 at different times.

In packing zone 211, rebin workers will receive the containers and sort the items therein onto one or more sorting apparatuses 330A-C. Although rebin workers are described as human, it should be noted that rebin workers may be implemented as automated machines and not limited to the examples described herein. For example, rebin workers may be implemented as a complex network of conveyor belts or robots configured to sort individual items. For ease of explanation without causing ambiguity, rebin workers are described as individuals hereinafter unless specifically stated otherwise.

In some embodiments, sorting apparatuses 330A-C may comprise one or more of a physical shelving, bookshelves, or an area, where multiple spaces or "cells" are arranged. For example in FIG. 3, sorting apparatuses 330A-C may comprise multiple cells in a grid marked by rows A, B, and C and columns 01, 02, and 03. Other arrangements of spaces and means of identification are also within the scope of the current disclosure. In some embodiments, each space or cell in sorting apparatus 330 may correspond to a particular order. Once rebin workers sort all purchased items for a particular order into a cell, the rebin worker may finalize the cell, which signals a packer to package the items in the cell into a box and send it out for delivery.

Sorting apparatuses 330A-C depict different states of a same sorting apparatus as rebin workers sort items in containers 321B, 323A, and 321A onto the sorting apparatus. For example, at the first stage, sorting apparatus 330A may contain items p and s in cell A02 and item q in cell C01. Items p, s, and q may be portions of other orders that were sorted onto sorting apparatus 330A from other containers. The other cells in sorting apparatus 330A: cells A01, A03, B01, B02, B03, C02, and C03 may be empty and not associated with any order.

As rebin workers receive container 321B and 323A and begin sorting them into sorting apparatus 330A, FO system 113 may assign associated orders to different cells. For example, FO system 113 may assign: order 312, which correspond to items h and i of container 323A, to cell A03; order 311, which correspond to items b and c of container 321B, to cell B01; order 315, which correspond to items b and j of containers 321B and 323A, to cell B03; and order 313, which correspond to item d of container 321B, to cell C03. Sorting apparatus 330B depicts a state of sorting apparatus 330A after the rebin workers have finished sorting all items from containers 321B and 323A.

As rebin workers receive container 321A and begin sorting again, FO system 113 may assign each item a from container 321A to different orders already on sorting apparatus 330B. And as depicted in sorting apparatus 330C once the sorting is complete, cells A03, B01, and B03 may contain all items associated with the corresponding orders 312, 311, and 315, respectively, while cell C03 is still missing items g and k. Containers 322A and 323B will need to arrive at packing zone 211 in order for rebin workers to finish sorting all items of order 313 and order 313 is ready for packaging. In some embodiments, rebin workers may not know where other containers are, whether cells A03, B01, or B03 are complete, when cells A02, C01, and C03 may be complete, how many items need to be sorted into any of the cells, or the like.

As described above, however, currently disclosed embodiments allow rebin workers to focus solely on sorting items from one container to a cell designated by FO system 113, while FO system 113 gathers data associated with each item, order, batch, and container generated throughout order fulfillment process 300 and within FC 200, make necessary determinations to facilitate fulfillment of each order, and present appropriate instructions to rebin workers.

Figure 4:
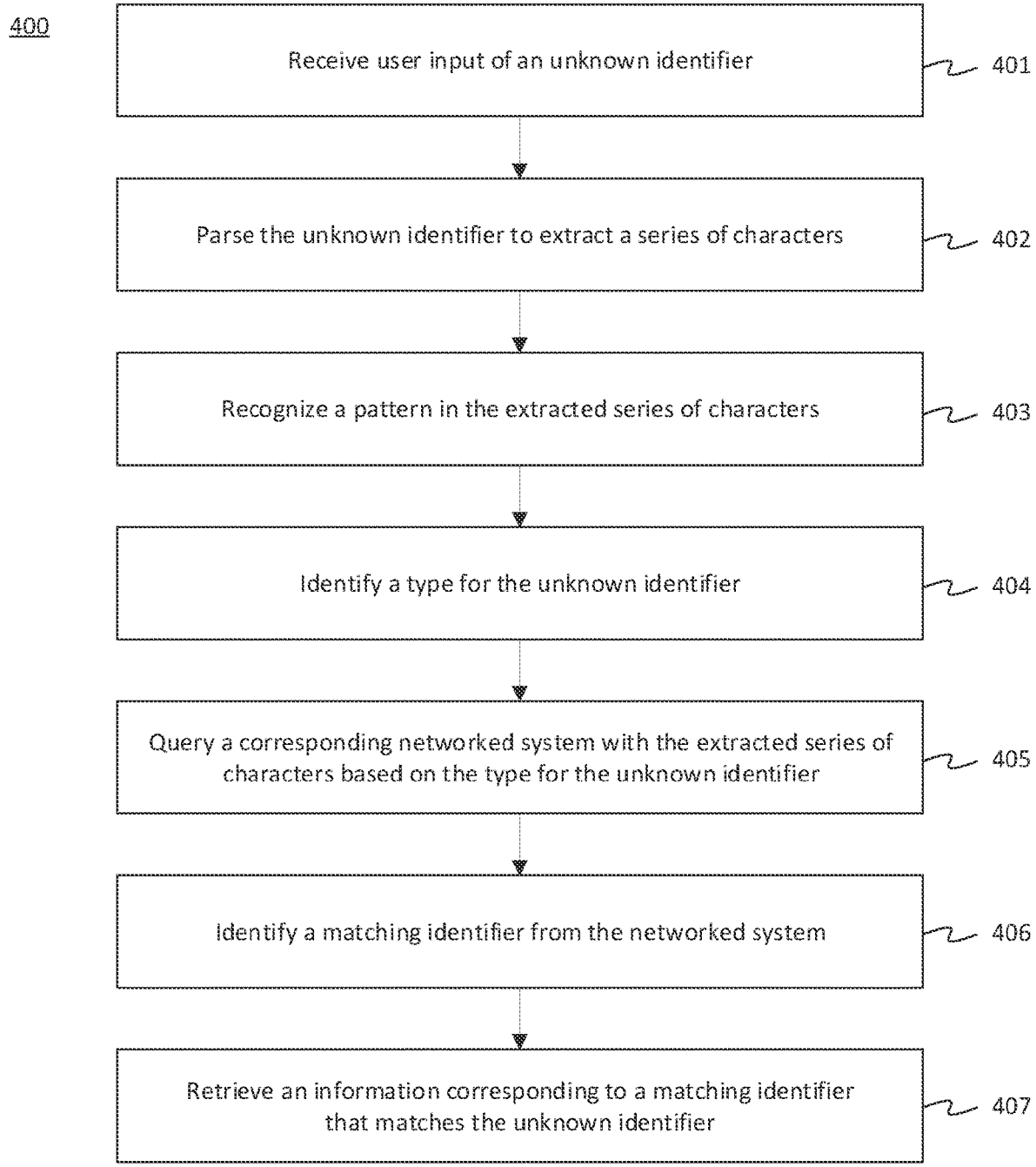
FIG. 4 is a flowchart of an exemplary computerized process for recognizing the type of an identifier received through a user input, consistent with the disclosed embodiments.

In some embodiments, various systems and UI described herein may be configured to receive user inputs of different identifiers such as an order identifier, item identifier, container identifier, and the like. When a user input of a particular identifier is received, however, the systems and UI must be able to parse the identifier, recognize which type of identifier it is, and take appropriate actions. FIG. 4 is a flowchart of an exemplary computerized process 400 for recognizing the type of an identifier received through a user input. Process 400 may be performed by any of processors associated with any systems described above in FIG. 1A.

In some embodiments, step 401 of process 400 may comprise receiving a user input, via an input device (e.g., a camera, a scanner, or a keyboard) configured to read or capture a physical identifier (e.g., a barcode, a Quick Response (QR) code, or an image) of an unknown identifier. In some embodiments, the user input may be an optical reading of a barcode, an image of a QR code, a text input of a series of characters, or an image of a series of characters.

At step 402, process 400 may comprise parsing the unknown identifier to extract a series of characters such as a universal product code (UPC), a stock keeping unit (SKU), or a series of characters formatted in a predetermined pattern. The characters may include alphanumeric characters, special characters, or foreign-language characters. Such parsing may involve decoding a barcode, decoding a QR code, performing an optical character recognition (OCR) or the like.

Process 400 may further comprise, at step 403 recognizing a pattern in the extracted series of characters, where each pattern is predefined to indicate the type of identifier. Recognizing the pattern, at step 403, allows process 400 to identify a type for the unknown identifier, at step 404. For example, the pattern may comprise first three characters of the extracted series of characters, where "WKS" indicates that the unknown identifier is a workstation identifier while "STA" indicates that the unknown identifier is a sorting apparatus identifier.

Once the identifier's type is recognized, the processor, at step 405, may query any of the networked systems such as WMS 119, LMS 125, a database of orders within FO system 113, and a database of items within FO system 113 as appropriate to obtain corresponding information.

At step 406, the queried system or the processor may identify a matching identifier from its records based on a search function or an index.

At step 407, the processor may retrieve an information corresponding to the matching identifier.

Figure 5:
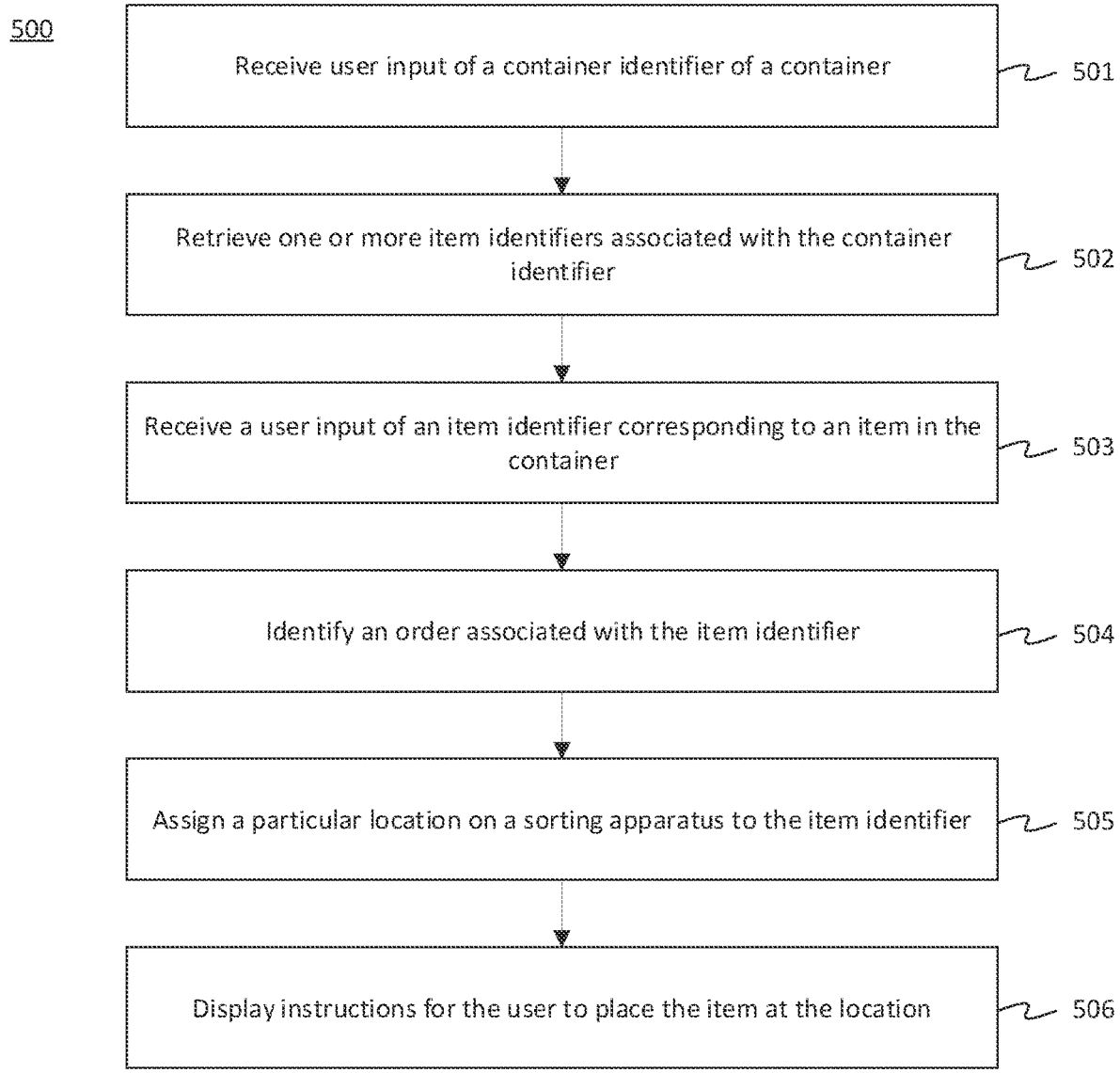
FIG. 5 is a flowchart of an exemplary computerized process for providing instructions for sorting items, consistent with the disclosed embodiments.

FIG. 5 is a flowchart of an exemplary computerized process 500 for providing instructions for sorting items. In one aspect, process 500 may be performed by FO system 113 and communicated to a rebin worker via computer 119C. In another aspect, process 500 may be performed by computer 119C based on data from FO system 113 and communicated to a rebin worker. Furthermore, in some embodiments, process 500 may be repeated multiple times as a rebin worker sorts each container, wherein steps 503-506 may be repeated multiple time for each container as the rebin worker scans each item in the container. It should be noted that any step in process 500 that involves receiving any type of identifier (e.g., step 501) may involve recognizing the type of the received identifier described above with respect to FIG. 4.

At step 501, computer 119C may receive a user input of a container identifier. In response, at step 502, computer 119C may retrieve, from FO system 113, one or more item identifiers associated with the container identifier, wherein each of the item identifiers are also associated with an order. In some embodiments, the container identifier may correspond to a container (e.g., container 321B of FIG. 3) that arrived at packing zone 211 with one or more items contained therein. As described above, the user (e.g., a rebin worker) is then instructed to scan each item in the container and place the item at a particular location on a sorting apparatus as assigned by computer 119C. In some embodiments, the sequence in which the user scans the items may not affect process 500.

At step 503, computer 119C may receive another user input of an item identifier corresponding to an item in the container that the rebin worker currently scanned. In response, computer 119C may identify, at step 504, an order associated with the current item so that computer 119C may assign, at step 505, a location on the sorting apparatus to the item identifier of the current item. In some embodiments, computer 119C may also transmit a signal to FO system 113, which updates an order information associated with the identified order to reflect that the item is being sorted at packing zone 211.

Assigning a location at step 505, in some embodiments, may involve a consideration of a number of factors. In one aspect, computer 119C may determine whether the identified order matches any of the orders already assigned to a location on the sorting apparatus. Computer 119C may use an order identifier corresponding to the identified order as a key to search through a database in FO system 113 or a database in computer 119C that stores association data between order identifiers and locations on the sorting apparatus.

When a match is found, computer 119C may assign the same location to the item identifier of the current item. When no match is found, however, indicating that the current item is the first item of the identified order to be sorted, computer 119C may assign a new location among any location on the sorting apparatus that is not currently assigned to an order (i.e., the location is empty) by adding a database entry to the database in FO system 113 or the database in computer 119C, associating the new location with the identified order identifier.

In some embodiments when more than one locations are empty, computer 119C may assign the new location based on at least one of a total weight of the items associated with the identified order, total weights of items associated with orders assigned to other locations on the sorting apparatus, or total weight of items associated with orders to be assigned to the sorting apparatus as determined by the items held in the currently scanned container. In some embodiments, computer 119C may rank the total weights of the orders already assigned or will be assigned to the sorting apparatus, including the total weight of the identified order, and assign a location to the identified order so that the heavier orders are assigned to lower rows of the sorting apparatus while lighter orders are assigned to the upper rows. Other processes of assigning new locations are also described in U.S. patent application Ser. No. 16/276,722, entitled "System and Method of Sorting Apparatus Cell Allocation for Fast E-Commerce Order Fulfillment," which is incorporated herein by reference in its entirety.

At step 506, computer 119C may display instructions for the rebin worker to place the current item at the assigned location by generating an indicator for presentation to the rebin worker for placing the current item at the assigned location. The indicator may be any combination of any number of a visual indicator (e.g., an icon, a text, or a blinking screen), an acoustic indicator (e.g., a beep, a voice, or a ring), or a tactile indicator (e.g., a vibration). In some embodiments, as an indicator, computer 119C may display a location identifier (e.g., text "B02" which corresponds to cell B02 on sorting apparatuses 330A-C) on its screen to indicate that the current item a should be placed at the location associated with the location identifier (i.e., cell B02).

FIGS. 6A-C, 7A-H, and 8A-B are exemplary embodiments of UI consistent with performing any of the disclosed processes. It should be noted that any function described with respect to FIGS. 6A-C, 7A-H, and 8A-B that involves receiving any type of identifier (e.g., for workstation ID textbox 605) may involve recognizing the type of the received identifier described above with respect to FIG. 4. In some embodiments, the UI elements described herein may be displayed, for example, on a display device connected to computer 119C.

Figure 6A:
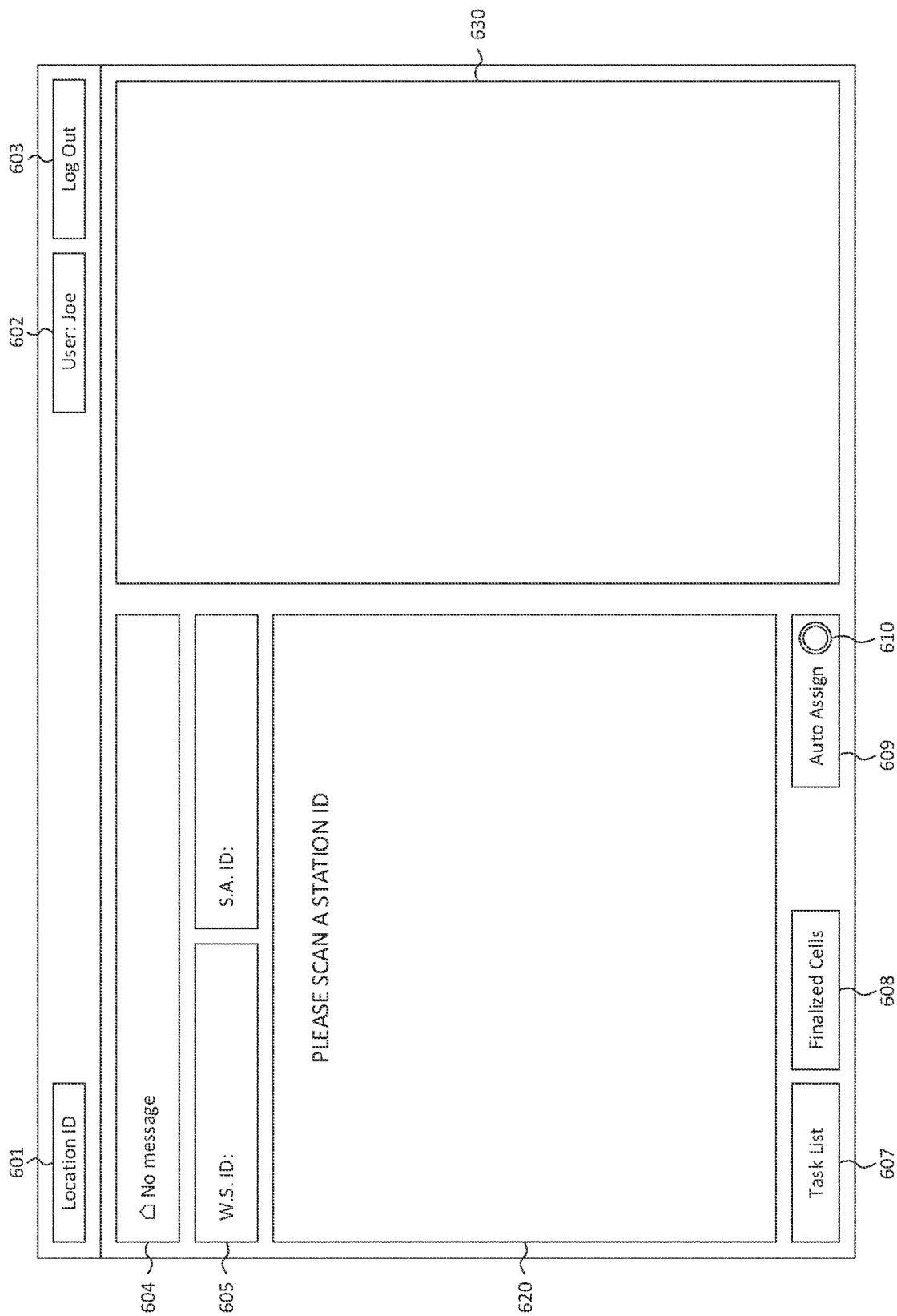
FIG. 6A is an exemplary embodiment of an initialization UI from which a worker may setup his or her work environment, consistent with the disclosed embodiments.

FIG. 6A is an exemplary embodiment of an initialization UI 600A from which a user (e.g., a rebin worker) may setup his or her work environment (i.e., where the user will work for a given period of time). In some embodiments, initialization UI 600A may comprise GUI elements such as buttons, textboxes, or images configured to receive user input or display information. In particular, initialization UI 600A includes a location ID textbox 601 that indicates the location of computer 119C (e.g., a name of FC 200, a floor or a zone within FC 200); a user ID textbox 602 that indicates an identity of the user; and a log out button 603 that allows the user to log out of computer 119C. In some embodiments, the textboxes may be configured to serve also as a button that can perform certain actions in response to a user input.

In some embodiments, initialization UI 600A further comprises a workstation ID input box 605 configured to receive a user input of a workstation identifier (ID) of a particular workstation (e.g., computer 119C) for his or her use. The user may input the workstation ID by scanning an identifier (e.g., a barcode, an image, a Quick Response (QR) code, a text string, an RFID tag) on computer 119C using an input device (e.g., RFID reader, camera, or scanner) or entering the same using a manual input device (e.g., keyboard, mouse, virtual keyboard on a touchscreen). Having the user scan or enter a workstation ID of computer 119C at the beginning of each work session as disclosed may allow a greater flexibility in assigning different workers to different locations or tasks based on need. For example, a worker may be initially assigned to work at computer 119C in packing zone 211 but get transferred to picking zone 209 at a later time due to a shifting demand.

In some embodiments, initialization UI 600A may also comprise a message box 604 configured to display a message to the user from time to time; a task list button 607 configured to display a consolidated task list for the user; a finalized cell status button 608 configured to display a summary screen of finalized cells; an auto assign text box 609 and an auto assign toggle button 610 configured to select and indicate whether computer 119C may assign a new container to the user. Each of these UI elements of initialization UI 600A and their associated functions are described below in more detail with respect to FIGS. 6B, 7A, 8A, and 8B.

In some embodiments, initialization UI 600A may also comprise a container pane 620 configured to display at least one of information on a currently scanned container or an item therein, or an instruction for the user. In the embodiment shown in FIG. 6A, for example, container pane 620 is configured to display an instruction for the user to scan a workstation ID. Alternatively or additionally, initialization UI 600A may comprise an item pane 630 configured to display information on at least one of a currently scanned item, a location assigned to the item, other items associated with the same order as the currently scanned item, or the like. Container pane 620 and item pane 630 are described below in more detail with respect to FIGS. 7A-7H.

Figure 6B:
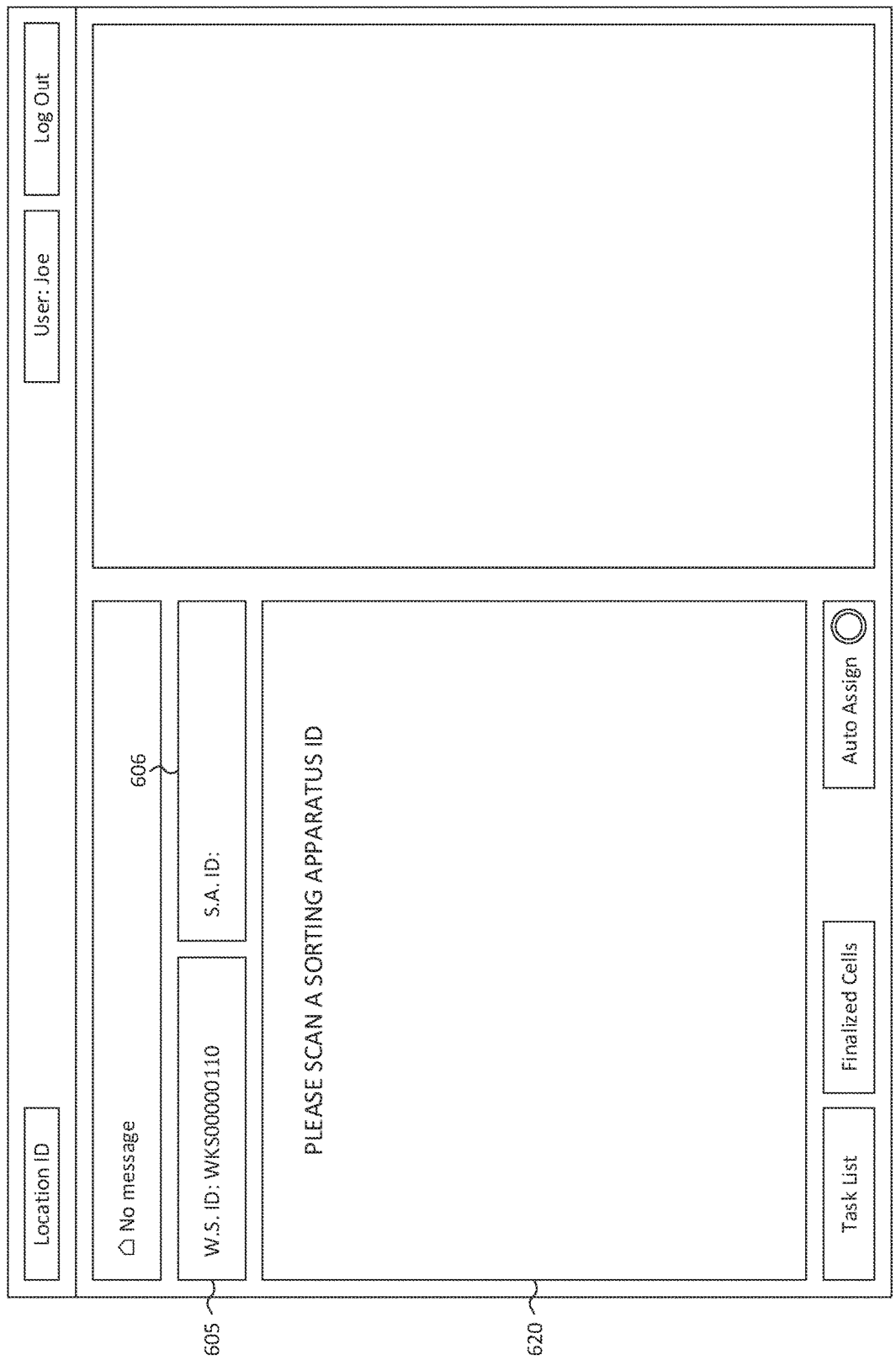
FIG. 6B is an exemplary embodiment of the initialization UI prompting the user to input a sorting apparatus identifier, consistent with the disclosed embodiments.

Upon a successful identification of a workstation ID based on a user input received in response to the instruction displayed in container pane 620 of FIG. 6A, computer 119C may display initialization UI 600B of FIG. 6B, a version of initialization UI 600A with a workstation ID displayed in workstation ID input box 605. In some embodiments, container pane 620 may now display an instruction to scan a sorting apparatus ID.

In some embodiments, initialization UI 600B may comprise a sorting apparatus ID input box 606 configured to receive a user input of a sorting apparatus ID of a particular sorting apparatus. The user may input the sorting apparatus ID by scanning an identifier (e.g., a barcode, an image, a Quick Response (QR) code, a text string, an RFID tag) on a sorting apparatus using an input device (e.g., RFID reader, camera, or scanner) or entering the same using a manual input device (e.g., keyboard, mouse, virtual keyboard on a touchscreen). In some embodiments, FO system 113 may store location information of one or more sorting apparatuses and available computers, and automatically assign a sorting apparatus to located nearest to computer 119C. In this case, FO system 113 may transmit a signal to computer 119C configured to input the sorting apparatus ID of the automatically assigned sorting apparatus. to sorting apparatus ID input box 606.

In some embodiments, FO system 113 may associate the locations of computer 119C and the sorting apparatus in order to determine location of a particular item or container. For example, scanning a container at computer 119C as described below will signal to FO system 113 that the container has made it through picking zone 209 and now is physically located at the location of computer 119C. In another example, scanning an item as described below will signal to FO system 113 that the item is at the location of computer 119C and will be placed at the sorting apparatus shortly. In some embodiments, FO system 113 can use this information to trace movements of containers and the items therein through fulfillment center 200.

Figure 6C:
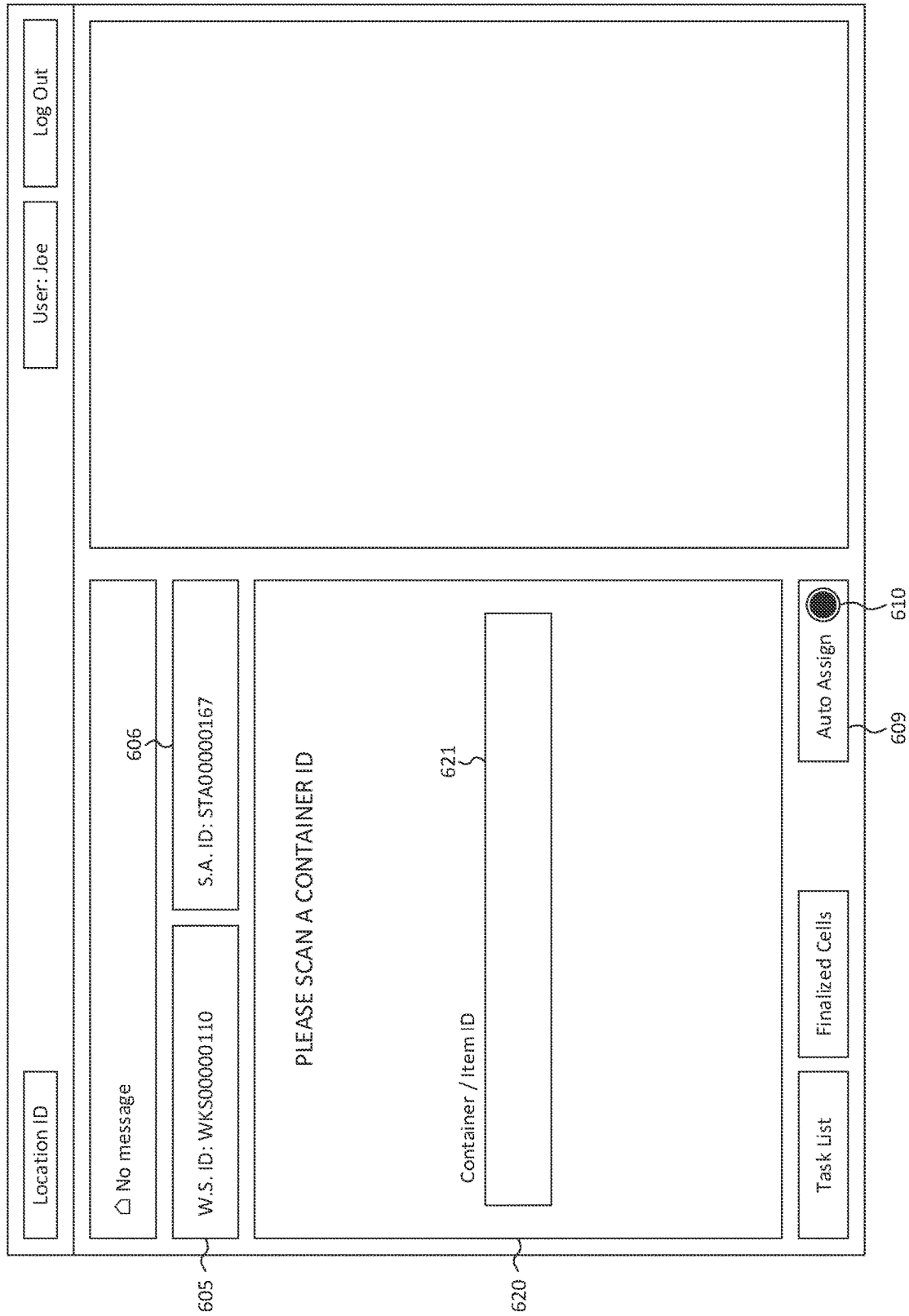
FIG. 6C is an exemplary embodiment of the initialization UI prompting the user to input a container identifier, consistent with the disclosed embodiments.

Upon a successful identification of a sorting apparatus ID based on a user input or a signal from FO system 113, computer 119C may display initialization UI 600C of FIG. 6C, another version of initialization UI 600A with a workstation ID displayed in workstation ID input box 605 and a sorting apparatus ID displayed in sorting apparatus ID input box 606.

In some embodiments, container pane 620 may now display an instruction to scan a container ID. In further embodiments, initialization UI 600C may comprise a container/item ID input box 621 configured to receive a user input of a particular container ID of a container (e.g., container 323A) or a particular item ID of an item from a container (e.g., container 323A). The user may input the container or item ID by scanning an identifier (e.g., a barcode, an image, a Quick Response (QR) code, a text string, an RFID tag) on a container or an item using an input device (e.g., RFID reader, camera, or scanner) or entering the same using a manual input device (e.g., keyboard, mouse, virtual keyboard on a touchscreen). In some embodiments where the user inputted an item ID of an item from a container, computer 119C may identify a container ID of the container by querying a database in FO system 113 that stores correspondence information between items and containers.

In some embodiments, auto assign toggle button 610 of FIG. 6C may switch to an on-state, indicating that computer 119C may assign a new container to the user. In one aspect, computer 119C may assign the new container when the user completes sorting every item included in a container. Additionally or alternatively, computer 119C may assign the new container when another worker (e.g., a manager of packing zone 211) transmits a signal to computer 119C, via a networked system, in order to facilitate order fulfillment as a whole such as prioritizing a container that had been delayed. The user may opt to block such assignments by toggling the auto assign toggle button 610 to an off-state.

Figure 7A:
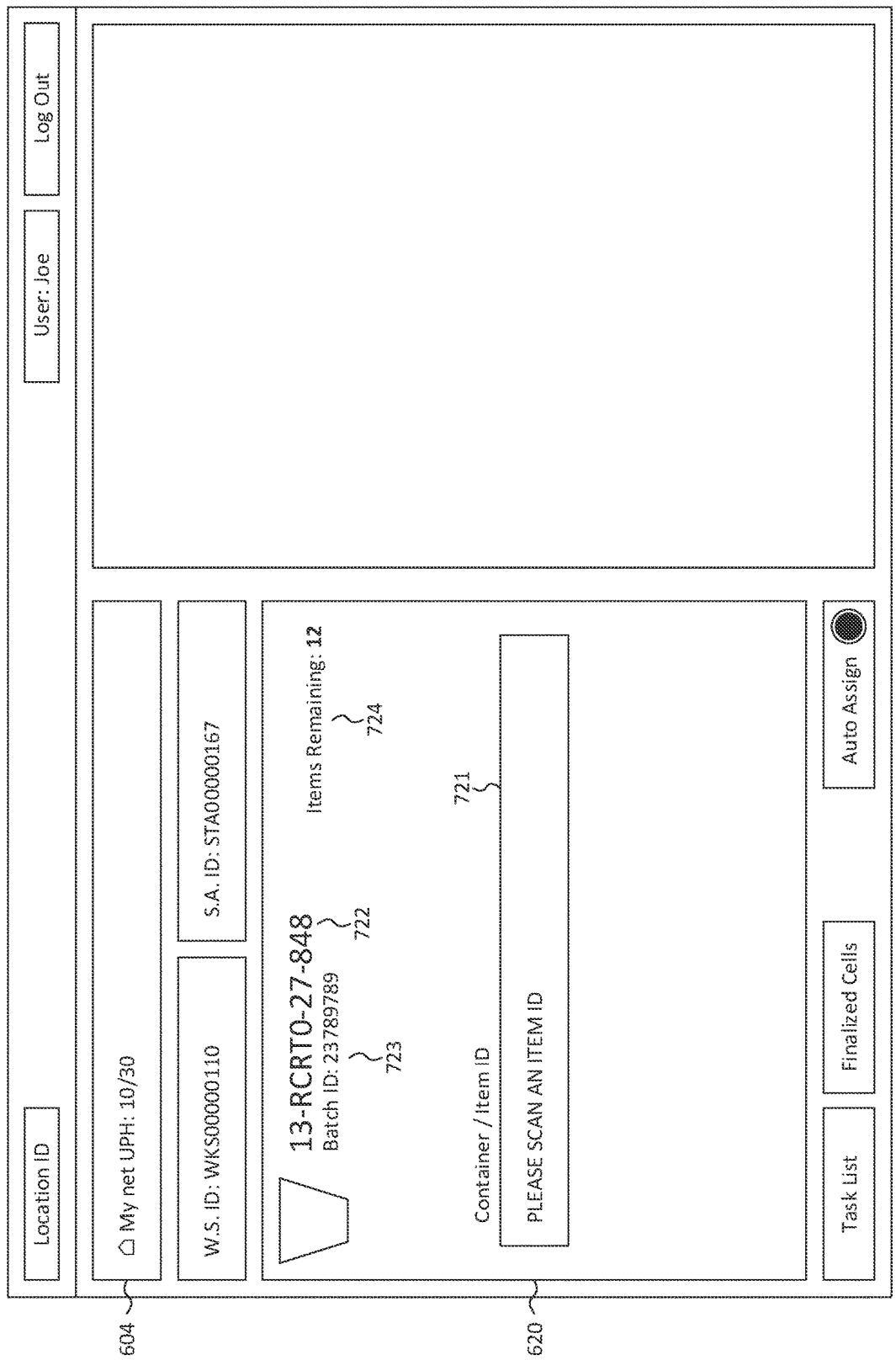
FIG. 7A is an exemplary embodiment of a sorting UI where the worker may begin a new sorting task, consistent with the disclosed embodiments.

FIG. 7A is an exemplary embodiment of a sorting UI 700A where the worker may begin a new sorting task. In some embodiments, sorting UI may be a version of initialization UI 600A with a workstation ID and a sorting apparatus ID displayed in workstation ID input box 605 and sorting apparatus ID input box 606, respectively, as well as information about a currently scanned container displayed in container pane 620. Additionally or alternatively, message box 604 may be modified to display a message related to performance statistic of the user such as a number of units the user has scanned per hour (UPH), a total number of containers the user has scanned over a certain period of time, or the like.

In some embodiments, the information displayed in container pane 620 may comprise a container ID 722 corresponding to the current container, a batch ID 723 associated with the current container, and a remaining items text box 724 configured to display a number of items contained in the current container that remain to be scanned by the user. In some embodiments, container/item ID input box 621 of FIG. 6C may be modified to container/item ID input box 721 of FIG. 7A, configured to display an instruction to scan an item ID of an item from the current container. The user may input the item ID by scanning an identifier (e.g., a barcode, an image, a Quick Response (QR) code, a text string, an RFID tag) on an item using an input device (e.g., RFID reader, camera, or scanner) or entering the same using a manual input device (e.g., keyboard, mouse, virtual keyboard on a touchscreen).

Figure 7B:
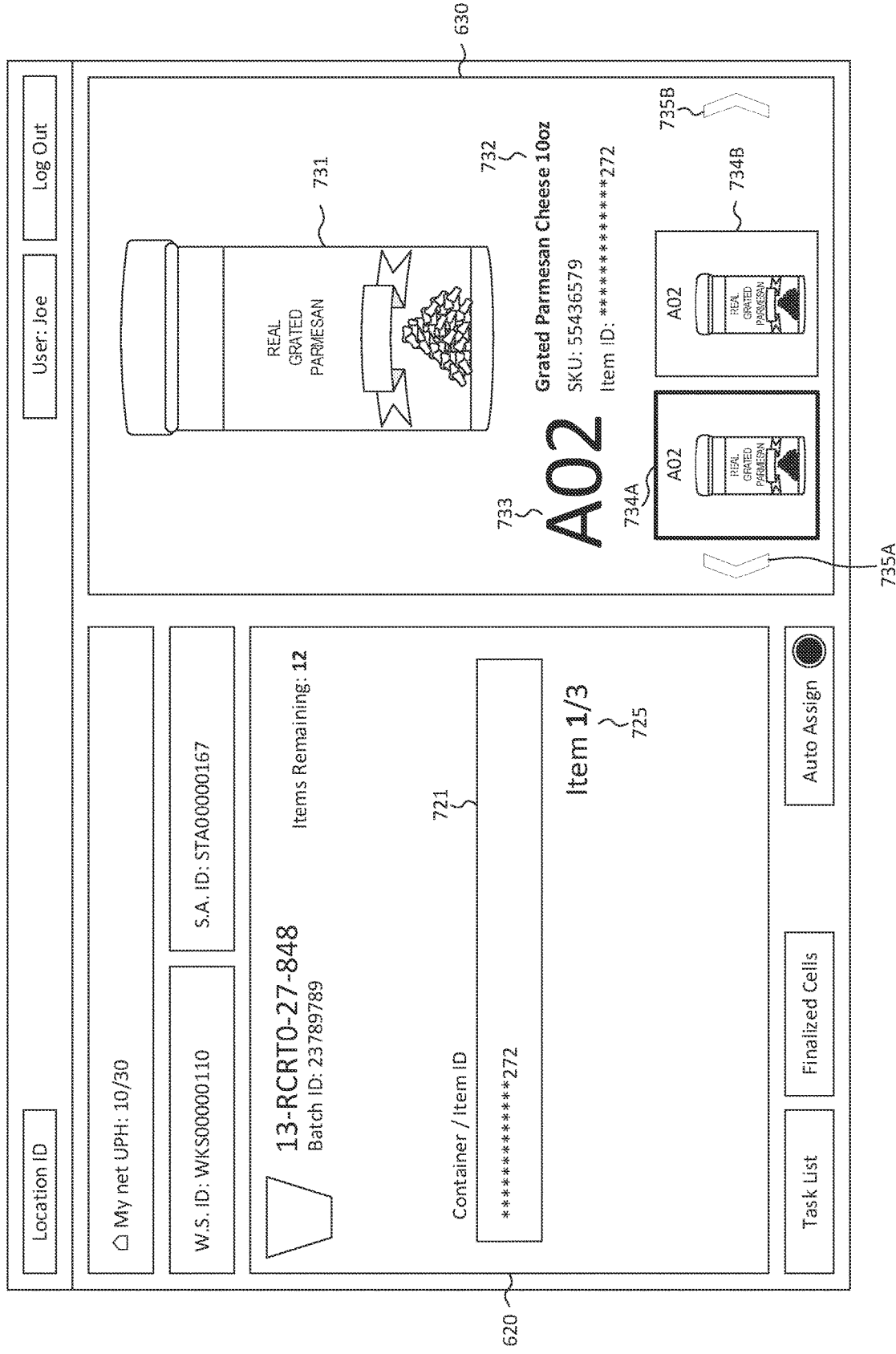
FIG. 7B is an exemplary embodiment of the sorting UI showing sorting instructions to the user, consistent with the disclosed embodiments.

Upon a successful input of an item ID, computer 119C may display sorting UI 700B of FIG. 7B, which may be a version of sorting UI 700A displaying item information related to the current container in container pane 620 and item information related to the current sorting apparatus in item pane 630.

In some embodiments, container/item ID input box 721 may display an item ID associated with the currently scanned item input by the user. Some embodiments may display a full series of characters of the item ID in container/item ID input box 721, but other embodiments may only display the last three digits of the item ID in order to allow quick visual comparison of the displayed item ID and the actual ID printed on the current item. Alternatively or additionally, container pane 620 may display a related item count 725, which may be configured to display a number of the current item scanned thus far out of a number of the current item originally held in the current container. For example, "1/3" displayed in related item count 725 of FIG. 7B indicates that there are three items in the current container corresponding to item ID "*************272" and that the currently scanned item is the first of the three.

In some embodiments, item pane 630 may display information related to the current item and its assigned location on the current sorting apparatus. The information may comprise a photo 731, details 732 (e.g., name, SKU, and ID), and an assigned location 733 of the current item. Computer 119C may determine assigned location 733 through the process described above with respect to FIG. 5. In some embodiments, displaying assigned location 733 as in FIG. 7B may serve as an instruction for the user to place the current item at the assigned location. Alternatively or additionally, sorting UI 700B may display or audibly announce an explicit message prompting the user to place the current item at the assigned location.

In some embodiments, item pane 630 may also display items in the current container that belong to the same order as the current item, as displayed in related item panes 734A and 734B. Related item panes 734A and 734B may be marked with the same location "A02" as assigned location 733 of the current item, indicating that they belong to the same location. In some embodiments, one of the related item panes may correspond to the current item and be indicated as such by the emphasized border around related item pane 734A. Although only two related item panes 734A and 734B are shown, the number is only exemplary and more or less item panes may be shown as appropriate. In some embodiments where there are too many related items to display, item pane 630 may also comprise navigation buttons 735A and 735B so that the user may browse other related items as desired. In the exemplary embodiment shown in FIG. 7B, however, related item panes 734A and 734B show only two of identical items, indicating that the order assigned to location A02 comprises only two of the same items from the current container. It should be noted, however, that there may be other containers containing one or more items from the current order.

In some embodiments, computer 119C may display the items in related item panes 734A-B based on the item ID of the current item. More specifically, using the order ID identified as part of assigning a location for the current item, computer 119C may retrieve a list of purchased item ID that correspond to items purchased as part of the current order. Computer 119C may then retrieve container ID associated with each of the purchased item ID and extract any purchased item ID with an associated container ID that matches the current container ID. Once one or more matching purchased item ID are found, computer 119C may assign assigned location 733 of the current item to the matching purchased item ID and display them in a corresponding number of related item panes 734.

After the user has placed the current item at the assigned location, the user may scan another item in the current container, which would cause computer 119C to display an updated set of information such as remaining items text box 724 displaying one less count (depicted in FIG. 7C), a new item ID in container/item ID input box 721, a new related item count 725, a new set of photo 731, details 732, assigned location 733, and related item pane(s) 734. When the new item is a last item of an order, however, computer 119C may display additional elements as shown in FIG. 7C.

Figure 7C:
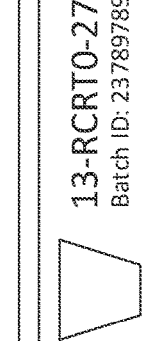
FIG. 7C is an exemplary embodiment of the sorting UI where the user has scanned all of the items included in an order, consistent with the disclosed embodiments.

FIG. 7C is an exemplary embodiment of sorting UI 700C where the user has scanned all of the items included in an order. Sorting UI 700C may be another version of sorting UI 700B displaying updated information as well as the additional elements for indicating that the user has scanned all of the items included in an order.

In a first aspect, sorting UI 700C shows a version of sorting UI 700B where a next item scanned by the user is identical to the previous item. In some embodiments, this may be indicated by the same information shown in container/item ID input box 721 and item pane 630, and updated information shown in remaining items text box 724 (one less) and related item count 725 (one more).

In a second aspect, sorting UI 700C also shows a version of sorting UI 700B where the second item is the last item of the order. In some embodiments, this may be noted by a completion mark 736, indicating that the location assigned to the current item and the associated order, location A02, is complete (i.e., all purchased items of the order have been scanned and there is no other container holding an item associated with the order).

Figure 7D:
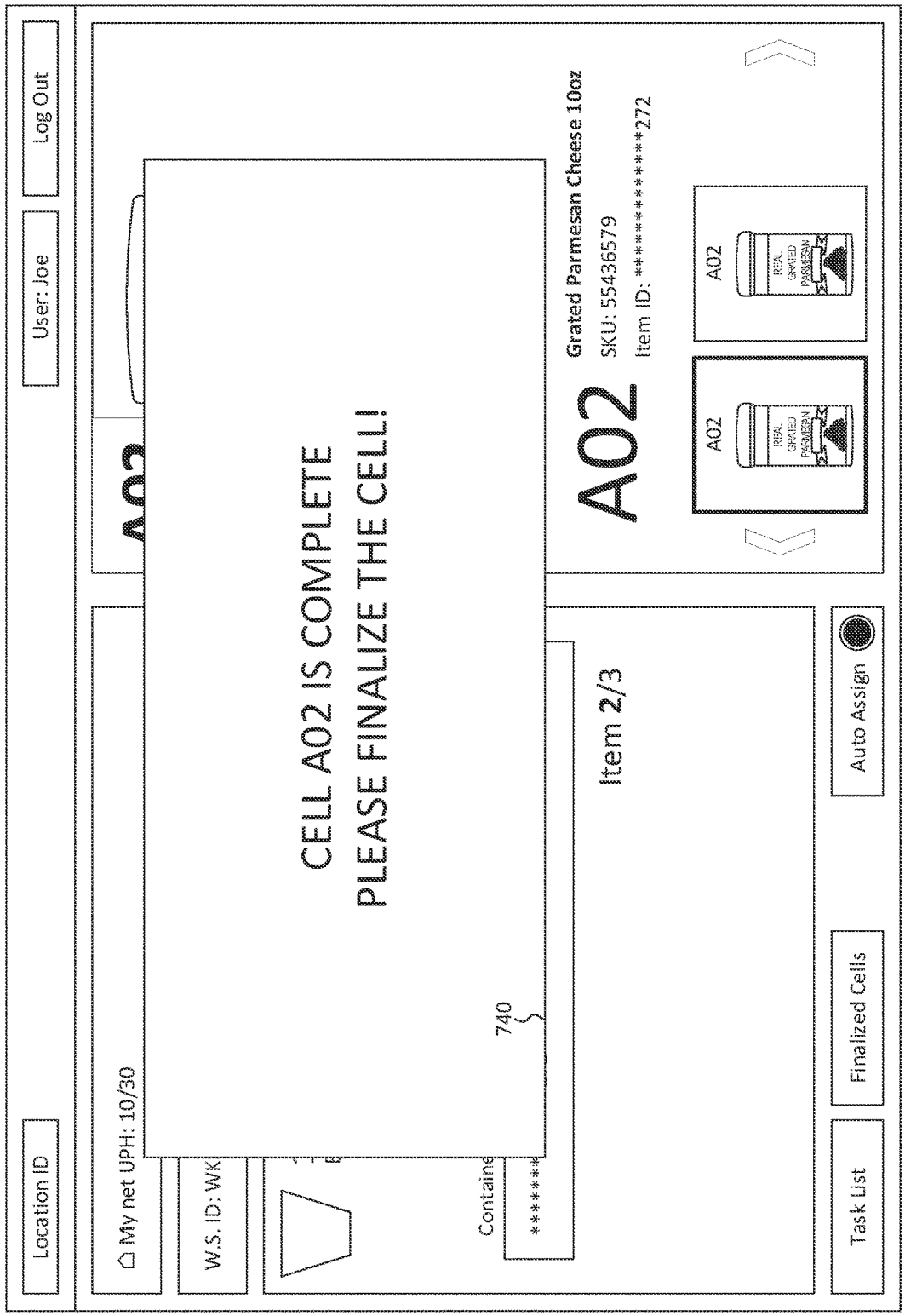
FIG. 7D is another exemplary embodiment of the sorting UI where the user has scanned all of the items included in an order, consistent with the disclosed embodiments.

In other embodiments, sorting UI 700D may display an announcement box 740, as shown in FIG. 7D, announcing that the location assigned to the current item and the associated order, location A02, is complete and instructing the user to finalize the location.

In some embodiments, finalizing a location may comprise switching the location from an unfinalized state to a finalized state, which may comprise, for example, toggling a button on a sorting apparatus corresponding to the location, transmitting a signal via computer 119C to change a state of an indicator associated with the location, manually moving the items placed at the location to another location, or the like. Regardless of the method, a finalized state may transmit a signal to a networked system to begin another operation on the items placed at the location. More specifically, switching the location to a finalized state may comprise modifying an automated indicator (e.g., an indicator light, a toggle switch, a lever) that signals another group of workers for packing the items (packers) or workstations associated with the packers to package the items placed at the location.

Figure 7E:
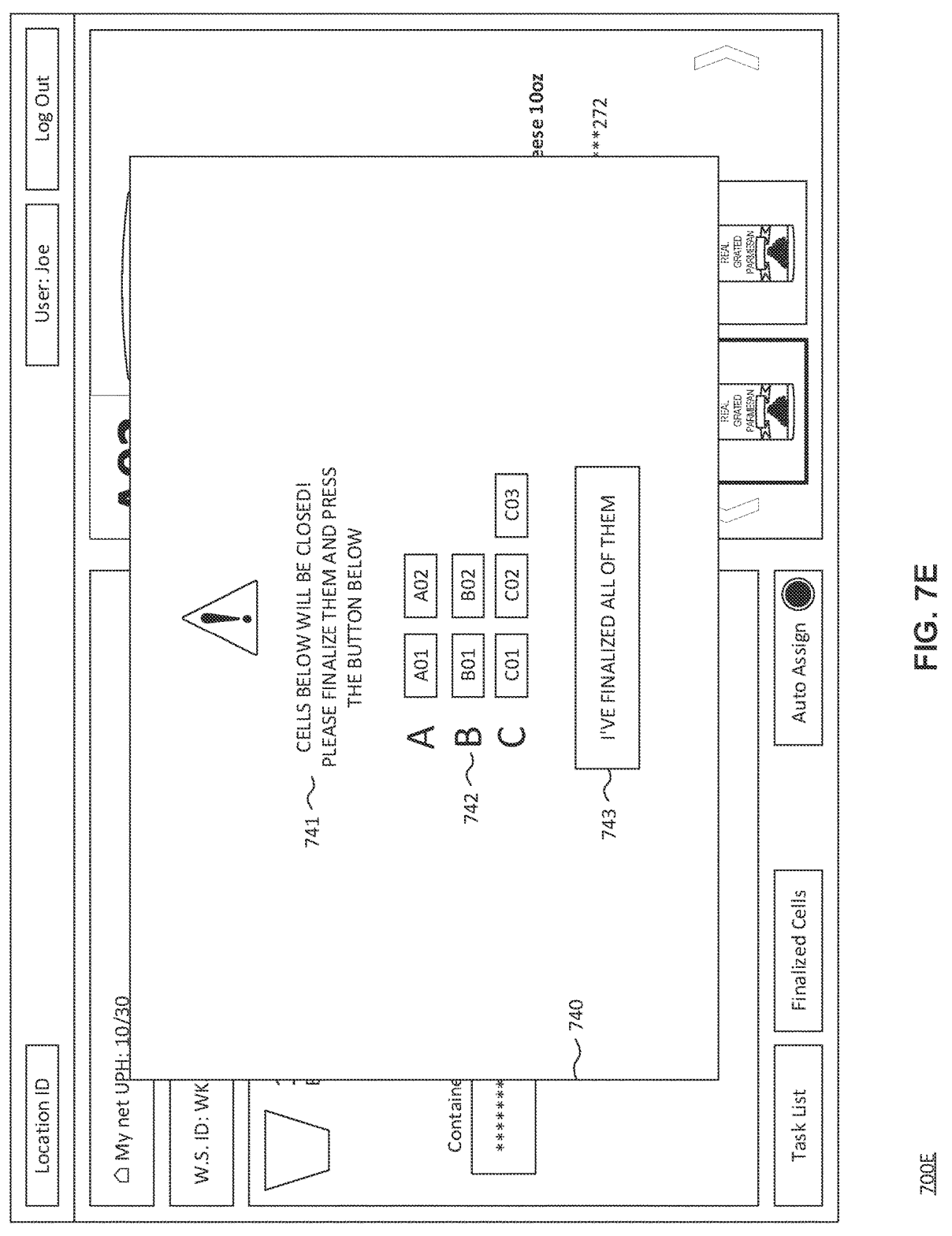

FIG. 7E is an exemplary embodiment of sorting UI 700E where the user is instructed to finalize a particular group of locations. Sorting UI 700E may be another version of sorting UI 700D displaying announcement box 740. In sorting UI 700E, however, announcement box 740 may comprise a warning message 741, communicating to the user that a particular group of locations need to be finalized because they will be closed; pending locations grid 742, showing a group of locations that must be finalized; and a confirmation button 743, prompting for the user's confirmation that he or she has finalized all of the locations shown in pending locations grid 742.

In some embodiments, computer 119C may display an announcement such as that shown in sorting UI 700E when one or more orders assigned to one or more locations are determined to be substantially delayed. Such determination of substantial delay may be made by computer 119C based on a period of time an order has been assigned to a location without being finalized by the user, by FO system 113 based on data gathered from other networked systems, or by a decision of another worker (e.g., a manager in charge of packing zone 211). In some embodiments, this determination may be based substantially on the location information collected every time a container or an item is scanned as discussed above. By gathering location information from each scan of an identifier and updating an associated location identifier with the location, FO system 113 may determine location of the scanned container or item. When collected and processed over time, this may allow FO system 113 to determine which containers (and items therein) are currently being sorted, which containers are on their way via transport mechanism 214, and which are still being picked at picking zone 209. In some embodiments, FO system 113 may use this information to determine that one or more containers are being delayed. Such processes of identifying delayed containers are described in U.S. patent application Ser. No. 16/299,619, entitled "System and Method for Computer-Implemented Split Shipping Communication Processes," which is incorporated herein by reference in its entirety.

Figure 7F:
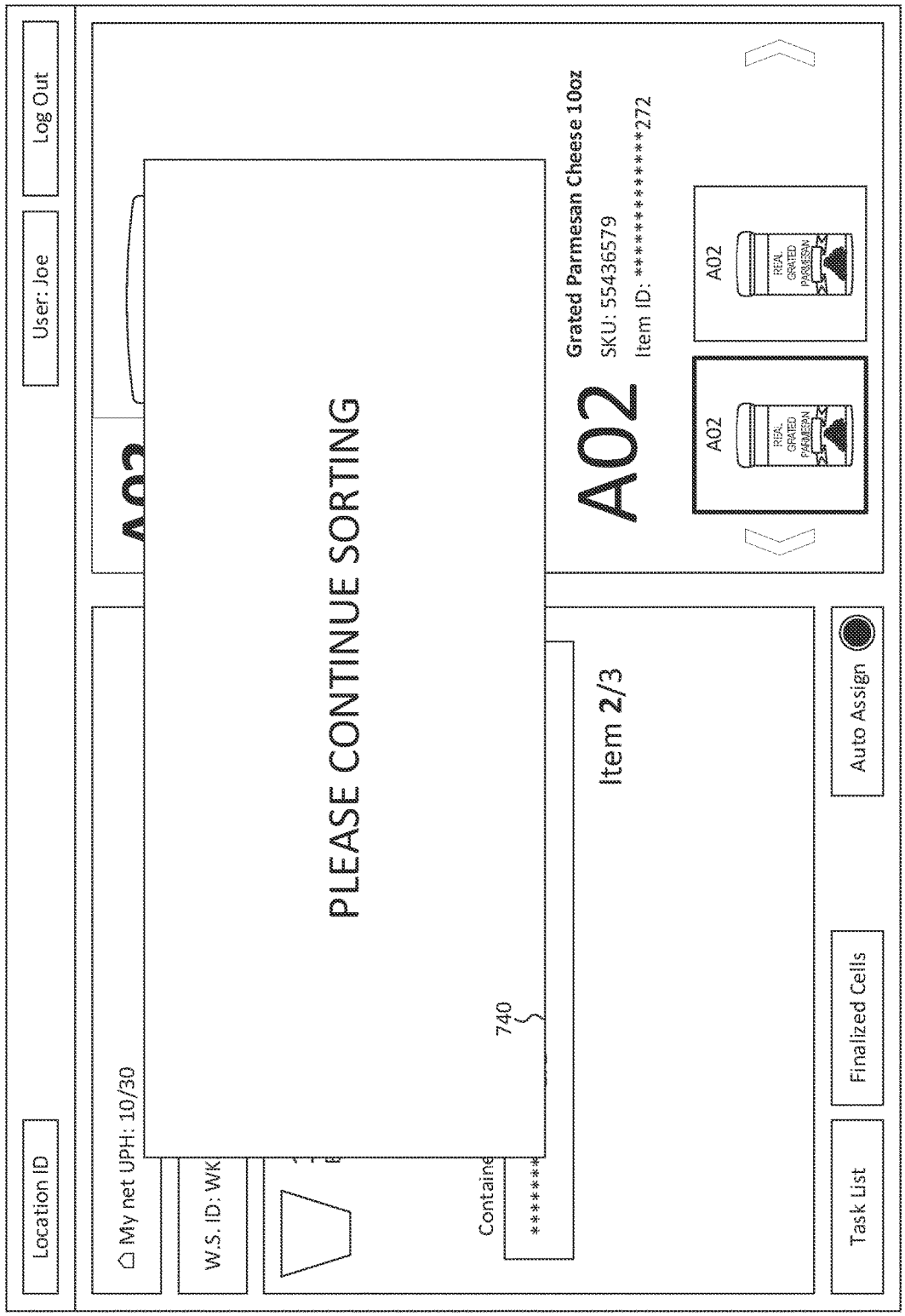
FIG. 7F is an exemplary embodiment of the sorting UI where the user is instructed to continue scanning items after finalizing the orders, consistent with the disclosed embodiments.

FIG. 7F is an exemplary embodiment of sorting UI 700F where the user is instructed to continue scanning items after finalizing the orders. Sorting UI 700F may be yet another version of sorting UI 700D displaying announcement box 740. In sorting UI 700F, however, announcement box 740 may comprise an instruction prompting the user to continue sorting.

Figure 7G:
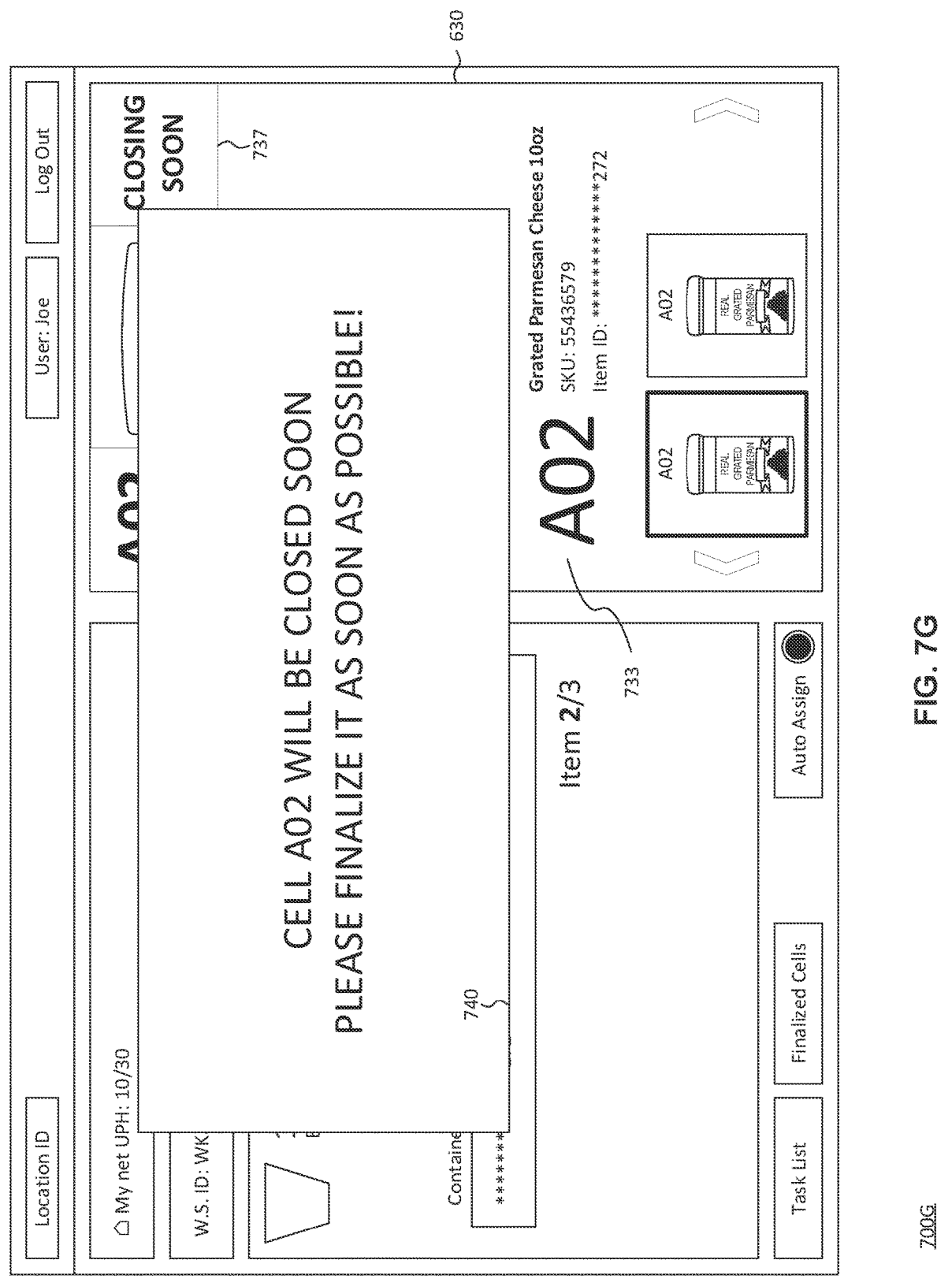

Furthermore, FIG. 7G is an exemplary embodiment of sorting UI 700G where the user is shown a notification that a particular location will be closed soon. Sorting UI 700G may be yet another version of sorting UI 700D displaying announcement box 740. In sorting UI 700G, however, announcement box 740 may comprise a notification that the location will be closed soon and an instruction to finalize the location as soon as possible. In some embodiments, closing a location soon may indicate that the order placed in the location is approaching a deadline or a time limit, after which the order will be considered delayed and ordered to be finalized as shown in FIG. 7E. Additionally or alternatively, item pane 630 may display an urgency mark 737 indicating that the particular location shown in assigned location 733 will close soon.

Similar to how the particular group of locations were determined to be substantially delayed in FIG. 7E, a determination that a particular location is approaching its deadline may be made by computer 119C based on a period of time an order has been assigned to a location without being finalized by the user, by FO system 113 based on data gathered from other networked systems, or by a decision of another worker (e.g., a manager in charge of packing zone 211).

Figure 7H:
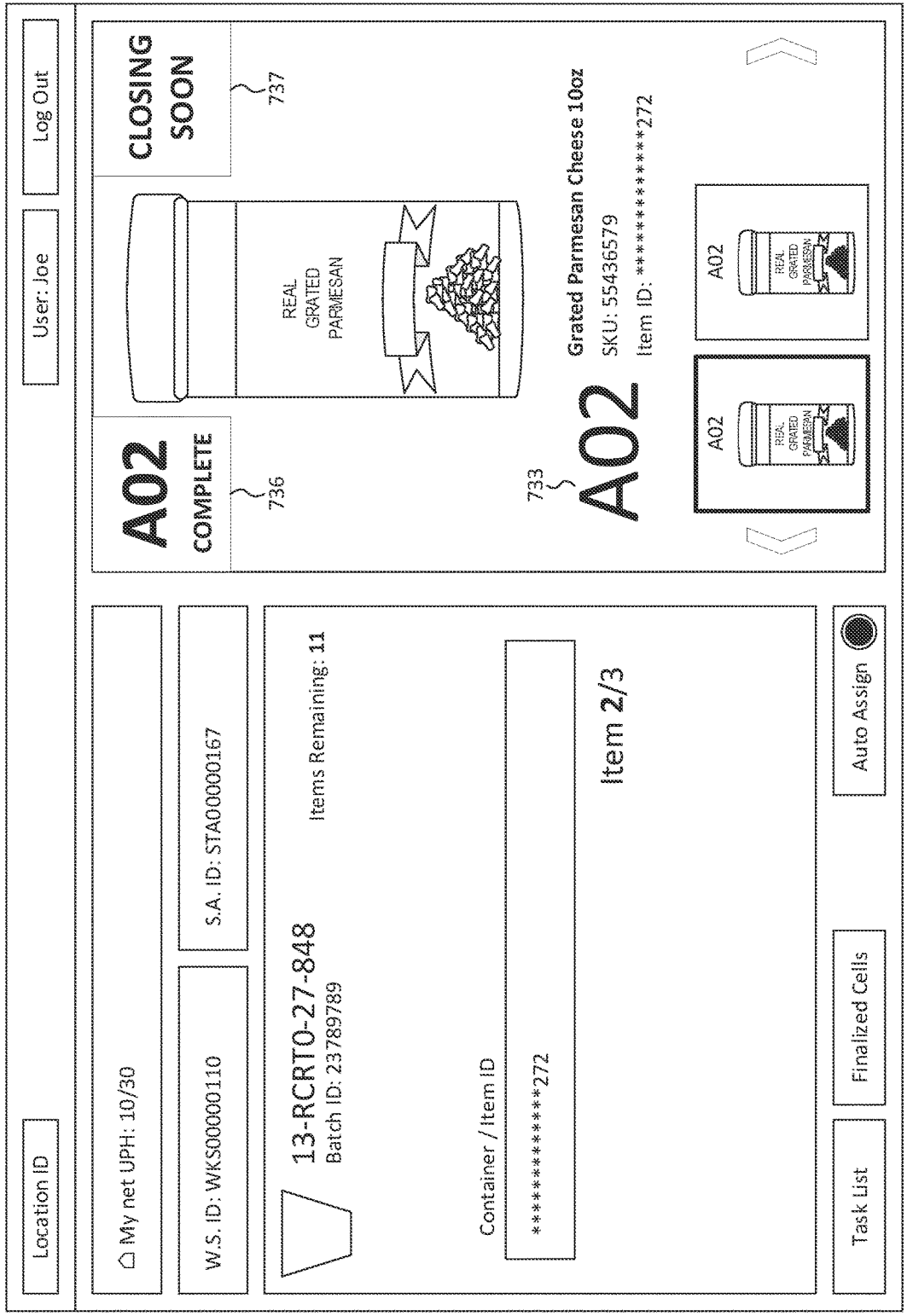
FIG. 7H is an exemplary embodiment of the sorting UI where the user is shown another notification that a particular location will be closed soon, consistent with the disclosed embodiments.

A version of sorting UI 700G without announcement box 740 but with urgency mark 737 is shown in FIG. 7H as sorting UI 700H. As shown in FIG. 7H, completion mark 736 may appear simultaneously with urgency mark 737 in embodiments where, for example, the order assigned to the location shown in assigned location 733 is completed when the location had been determined to be approaching its deadline or time limit.

FIG. 8A is an exemplary embodiment of sorting UI 800A displaying a consolidated list of tasks assigned to the user. Sorting UI 800A may be a version of sorting UI 700A when the user has selected task list button 607. In some embodiments, sorting UI 800A may display a consolidated list of tasks 810 comprising a table of information showing location (i.e., cell), batch ID, item name, item ID, container ID, and indications of the number of items processed currently and whether the location has been finalized.

Figure 8B:
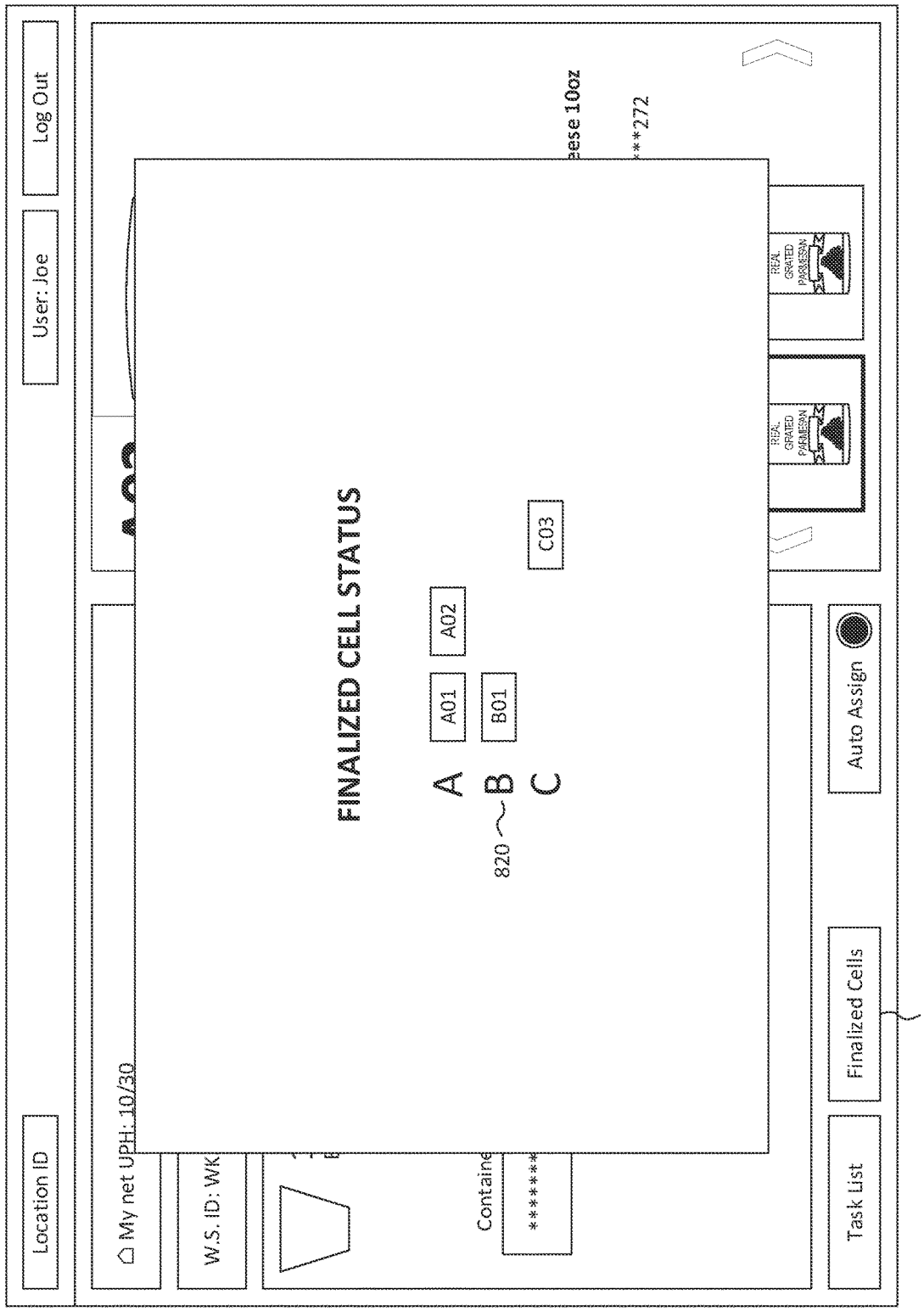
FIG. 8B is an exemplary embodiment of the sorting UI displaying a status of different locations on a sorting apparatus, consistent with the disclosed embodiments.

FIG. 8B is an exemplary embodiment of sorting UI 800B displaying a status of different locations on a sorting apparatus. Sorting UI 800A may be a version of sorting UI 700A when the user has selected finalized cell status button 608. In some embodiments, sorting UI 800B may display a finalized locations grid 820 showing a group of locations that has been finalized. In some embodiments, the user may refer to finalized locations grid 820 to confirm whether a location has been finalized yet.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for sorting items into a sorting apparatus, the system comprising:
a sorting apparatus comprising a first position and a second position;
a memory storing operations; and
at least one processor configured to execute the operations for:
receiving one or more item identifiers associated with one or more orders;
tracking locations of one or more items corresponding to the one or more item identifiers;
assigning the one or more item identifiers to either the first position or the second position based on a corresponding order;
sending a control signal to the sorting apparatus to finalize the first position or the second position in response to an indication that a subset of the one or more items are delayed;
wherein the indication that the subset of the one or more items are delayed is determined based at least on one of:
a length of time elapsed from assigning the subset of the one or more item identifiers to either the first position or the second position; or
a predetermined distance based on the locations of the subset of the one or more items; and
updating one or more electronic indicators corresponding to the first position or the second position associated with the control signal by switching corresponding states of the one or more electronic indicators in response to the control signal.

2. The computer-implemented system of claim 1, wherein tracking locations of one or more items corresponding to the one or more item identifiers comprises:
   scanning the one or more item identifiers on the one or more items; and
   determining the locations of the one or more item identifiers based on where the scanning took place.

3. The computer-implemented system of claim 1, wherein assigning the one or more item identifiers comprises:
   assigning a first subset of the one or more item identifiers corresponding to a first order to the first position; and
   assigning a second subset of the one or more item identifiers corresponding to a second order to the second position.

4. The computer-implemented system of claim 1, wherein assigning the one or more item identifiers comprises outputting, to a user, at least one of a visual, acoustic, or tactile signal corresponding to the first position or the second position.

5. The computer-implemented system of claim 1, wherein assigning the one or more item identifiers is based on a total weight of the one or more items corresponding to a same order.

6. The computer-implemented system of claim 1, wherein the subset of the one or more items correspond to a single order.

7. The computer-implemented system of claim 1, wherein the indication that the subset of the one or more items are delayed is determined based on a manual determination by a user.

8. The computer-implemented system of claim 1, wherein the one or more indicators comprise at least one of an indicator light, a toggle switch, or a lever.

9. A computer-implemented method for providing instructions to a user, the method comprising:
   receiving one or more item identifiers associated with one or more orders;
   tracking locations of one or more items corresponding to the one or more item identifiers;
   assigning the one or more item identifiers to either a first position or a second position of a sorting apparatus based on a corresponding order;
   sending a control signal to the sorting apparatus to finalize the first position or the second position in response to an indication that a subset of the one or more items are delayed;
   wherein the indication that a subset of the one or more items are delayed is determined based at least on one of:
      a length of time elapsed from assigning the subset of the one or more item identifiers to either the first position or the second position; or
      a predetermined distance based on the locations of the subset of the one or more items; and
   updating one or more electronic indicators corresponding to the first position or the second position associated with the control signal by switching corresponding states of the one or more electronic indicators in response to the control signal.

10. The computer-implemented method of claim 9, wherein tracking locations of one or more items corresponding to the one or more item identifiers comprises:
   scanning the one or more item identifiers on the one or more items; and
   determining the locations of the one or more item identifiers based on where the scanning took place.

11. The computer-implemented method of claim 9, wherein assigning the one or more item identifiers comprises:
   assigning a first subset of the one or more item identifiers corresponding to a first order to the first position; and
   assigning a second subset of the one or more item identifiers corresponding to a second order to the second position.

12. The computer-implemented method of claim 9, wherein assigning the one or more item identifiers comprises outputting, to a user, at least one of a visual, acoustic, or tactile signal corresponding to the first position or the second position.

13. The computer-implemented method of claim 9, wherein assigning the one or more item identifiers is based on a total weight of the one or more items corresponding to a same order.

14. The computer-implemented method of claim 9, wherein the subset of the one or more items correspond to a single order.

15. The computer-implemented method of claim 9, wherein the indication that the subset of the one or more items are delayed is determined based on a manual determination by a user.

16. A computer-implemented system for an efficient sortation of items by a user working under a limited access to information, the system comprising:
   a sorting apparatus comprising a first position and a second position;
   a handheld scanning device comprising an optical sensor
   a memory storing operations; and
   at least one processor configured to execute the operations for:
      tracking locations of one or more items associated with one or more orders;
      scanning one or more item identifiers corresponding to a subset of the one or more items using the handheld scanning device;
      assigning a first subset of the one or more item identifiers associated with a first order to the first position;
      receiving an indication that a first item associated with the first order is delayed based at least on two of:
         the tracked locations of the one or more items;
         a length of time elapsed from assigning the first subset of the one or more item identifiers to the first position; or
         a predetermined distance based on the tracked locations of the one or more items; and
      sending a control signal to the sorting apparatus to finalize the first position in response to the indication; and
      updating one or more electronic indicators corresponding to the first position associated with the control signal by switching corresponding states of the one or more electronic indicators in response to the control signal.

* * * * *